No. 876,439. PATENTED JAN. 14, 1908.
W. J. CROSSLEY & J. ATKINSON.
GOVERNING GEAR FOR INTERNAL COMBUSTION ENGINES.
APPLICATION FILED DEC. 17, 1906.
3 SHEETS—SHEET 1.
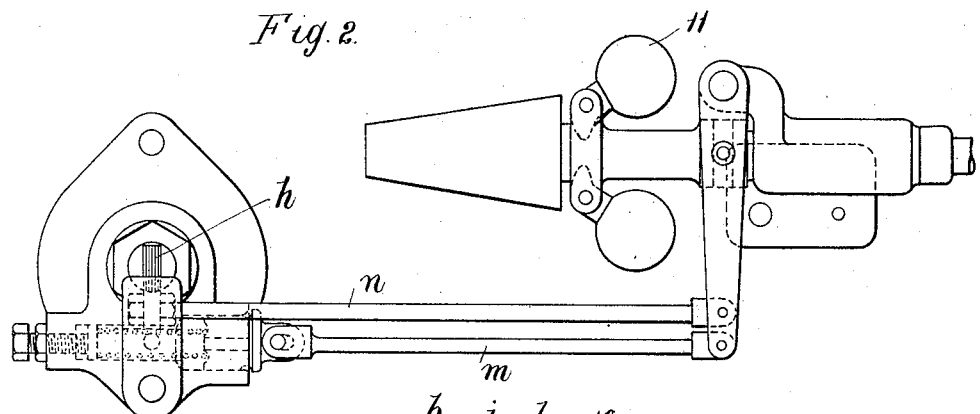
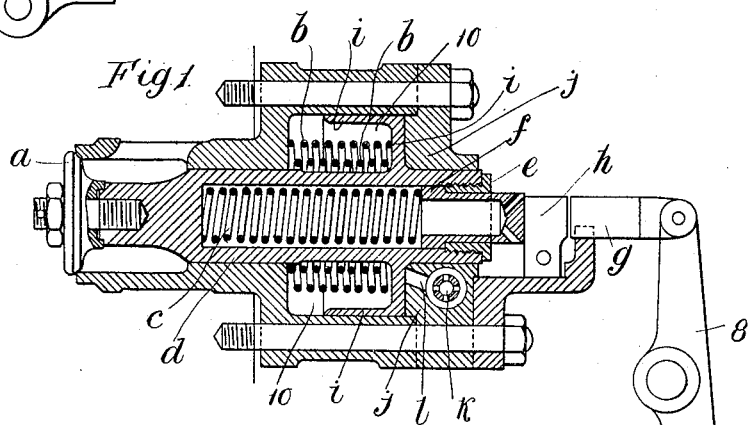
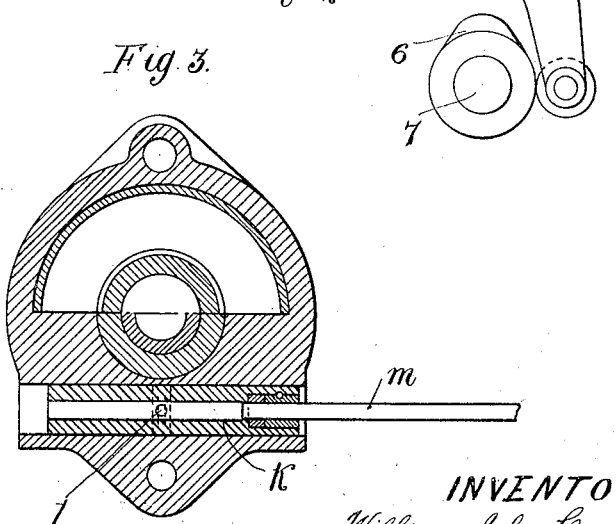
WITNESSES
INVENTORS
William John Crossley
James Atkinson
By Richardson
ATT'YS.

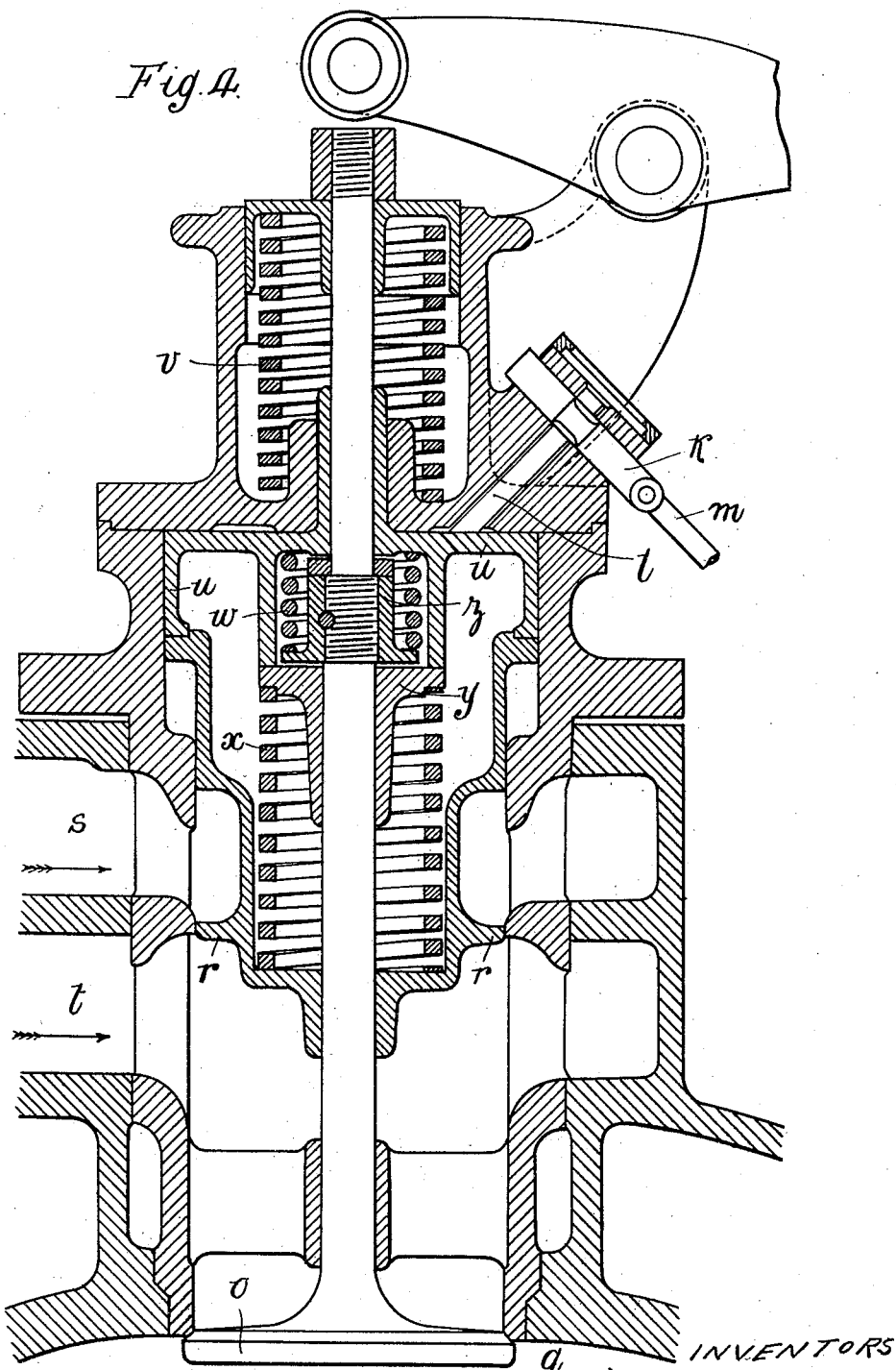

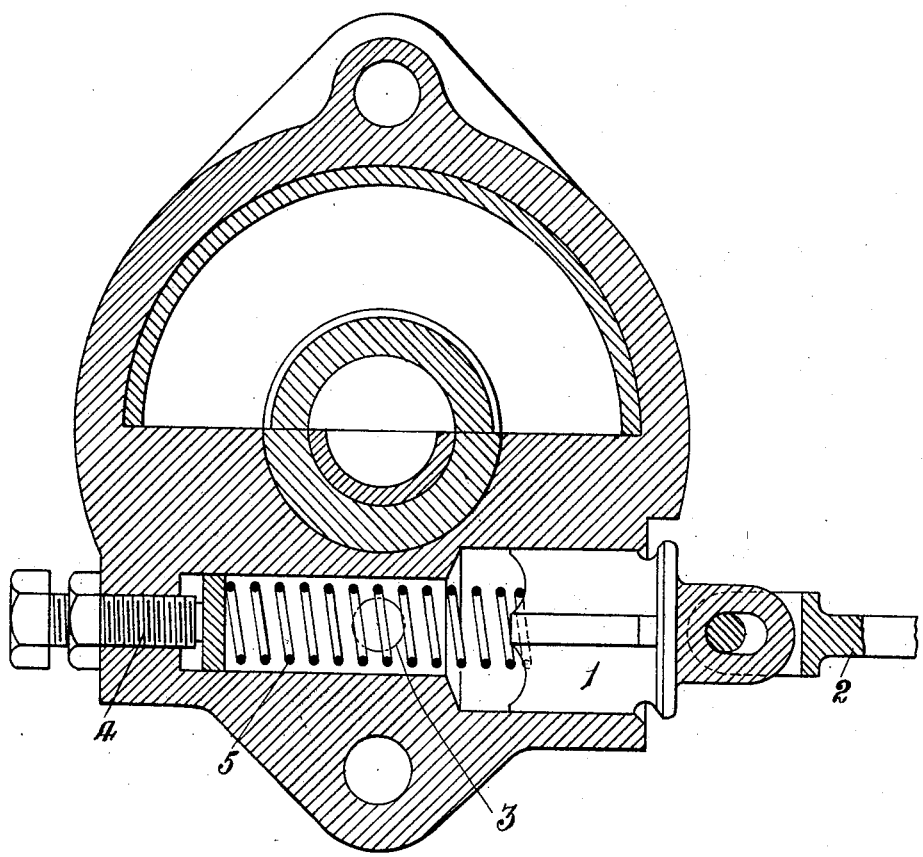

UNITED STATES PATENT OFFICE.

WILLIAM JOHN CROSSLEY, OF OPENSHAW, MANCHESTER, AND JAMES ATKINSON, OF MELLOR, ENGLAND.

GOVERNING-GEAR FOR INTERNAL-COMBUSTION ENGINES.

No. 876,439.    Specification of Letters Patent.    Patented Jan. 14, 1908.

Application filed December 17, 1906. Serial No. 348,321.

*To all whom it may concern:*

Be it known that WILLIAM JOHN CROSSLEY and JAMES ATKINSON, both subjects of Great Britain, the former residing at Openshaw, Manchester, in the county of Lancaster, England, and the latter residing at Mellor, in the county of Derby, England, have invented new and useful Improvements in Governing-Gear for Internal-Combustion Engines, of which the following is a specification.

In an arrangement for governing internal combustion engines operating on the "Otto" or four stroke cycle, and constructed in accordance with this invention, the cylinder (or each cylinder if more than one), is fitted with an exhaust valve, admission valve, and gas valve.

The method of and means for operating and controlling this gas valve with a view to varying the power of the impulses to suit the load on the engine for the time being is the object of this invention.

When the engine is required to give full power the gas valve is operated in a similar manner to the admission valve, opening and closing at approximately the same times either by connection with the same gear, or by means of separate gear. When full powered impulses are not required the gas valve is opened later but closed at the same time and on very light loads the gas valve may be kept closed entirely during some of the suction strokes.

To enable our invention to be clearly understood we append three sheets of drawings, in which—

Figure 1, Sheet 1, is an illustration of its application to an engine having a separate gas valve, in addition to the ordinary admission valve (not shown) for the explosive fluid mixture, Fig. 2 Sheet 1, is an end view of the same and Fig. 3, Sheet 1, is a section through the governor controlling valve. Fig. 4, Sheet 2, illustrates the same arrangement as applied to a combined gas and admission valve and Fig. 5, Sheet 3, is a detail showing an alternative arrangement for regulating the air in connection with the vacuum cylinder.

In Fig. 1 the gas valve $a$ is shown in its closed position being held closed by a spring $b$ (or springs $b$ $b$ as shown). A second stronger spring $c$ is so arranged that when the valve $a$ is closed, though the spring $c$ is more powerful than the springs $b$ $b$ which keep the valve closed, it has no tendency to open the valve $a$ owing to the fact that it is retained within stops which neutralize its effect upon the valve $a$ whenever this valve is closed.

It will be seen that the spring $c$ is inclosed in an inner chamber $d$, that it bears at one end against the end of the chamber and at the other end against a small plunger $f$ held in place by the screwed in piece $e$ and though there may be a considerable amount of compression pressure on the spring $c$, it has no tendency to move the valve $a$ when in the closed position shown in Fig. 1 and with the plunger $f$ against the piece $e$, the thrust at one end counteracting the thrust at the other end.

The operating gear moves to open the valve $a$ by any well known means to move the plunger $f$ inwards, (the device shown in the drawings consists of a knife-edged pusher piece $g$ acting on the movable die $h$) which is moved by a tappet 6 on the ordinary side shaft 7 and a pivoted lever 8. So soon as the plunger $f$ is clear from the screwed in piece $e$, the pressure of the spring $c$ is taken between the piece $g$ which operates the valve and the inner end of the chamber $d$, consequently the whole force of the spring $c$ is thrown upon the valve $a$, tending to open it. It will be seen from Fig. 1 that the valve $a$ has formed in one with it a vacuum piston $i$ and that the springs $b$ $b$ tend to close the valve $a$. These springs $b$ $b$ are together weaker than the spring $c$ consequently the operating gear can open the valve unless otherwise prevented. When the valve is closed the vacuum piston $i$ is at the end of the short cylinder 10 in which it moves being close up to the cover $j$ which closes it in. In this cover $j$ or in any other suitable position there is a cylindrical valve $k$ moving in a small cylinder formed in the cover and from this cylinder a small hole $l$ passes to the vacuum cylinder. If the valve $k$ closes the hole $l$, no air can get access to the vacuum cylinder 10 and the vacuum on the piston $i$, assisted by the springs $b$ $b$, will prevent the excess strength of the spring $c$ opening the valve $a$; if however the valve $k$ does not close the hole $l$, air can obtain access to the vacuum cylinder which thus loses its restraining influence, allowing the spring $c$ to overcome the springs $b$ $b$, and thus opening the valve $a$. If the hole $l$ is only opened to a small extent, air can only obtain restricted access to the vacuum cylinder and as a consequence the valve *a* is delayed in opening; with a greater opening to the hole *l* the restraining influence is not so great, and if free access of air is given to the vacuum cylinder the valve *a* is opened with or very shortly after the movement of the operating gear.

The valve *k* is operated by a suitable connection to the governor 11, it is shown so connected by a track rod *m* but it will be understood that a very small movement only is necessary for controlling the admission of air to the vacuum cylinder, and also very little power is required to be exerted by the governor to give this small movement, there being no direct resistance to overcome beyond the extremely slight frictional resistance.

The result of the action above described is that when full impulses are desired in the engine the gas valve *a* is opened practically during the whole of the suction stroke, consequently the cylinder is filled with a uniform rich mixture; for lighter loads, when the governor comes into operation to restrict the admission of air to the vacuum cylinder, the opening of the valve *a* is delayed, more or less, according to the position of the valve *k* in relation to the hole *l*. The valve *a* also opens less rapidly but towards the end of the stroke it is sufficiently opened to admit a rich mixture at the last, stratification of the gas and air is thus caused to take place in the cylinder, there always however being a rich mixture drawn in at the last which remains in the neighborhood of the ignition point, consequently giving satisfactory ignition even with charges containing a small percentage of combustible.

In the arrangement shown in Figs. 1, 2 and 3 the governor is so arranged that it not only moves the valve *k* through the track rod *m* but also the die *h* by means of the track rod *n*, in such a manner that when the valve *k* has almost or entirely cut off the admission of air to the vacuum cylinder, the die *h* is also moved out of the position in which the knife-edged pusher *g* can strike it, consequently the valve *a* is not opened at all, no gas is admitted to the cylinder during such suction strokes and no impulse is obtained, so that very weak, uneconomical charges are never drawn into the cylinder. As however under such conditions the load on the engine would be slight, the stored up energy in the flywheel bears a greater relative proportion to the load and the engine runs with similar regularity to that obtained under full powered impulses and full load conditions.

Fig. 4 shows the arrangement in which the spindle of the admission valve passes through the gas valve, the various necessary springs and the vacuum regulating piston with its cylinder. In this arrangement *o* is the admission valve admitting the charges to the cylinder *q*; and *r* is the gas valve having the vacuum piston *u* fixed to it so that they move as one piece. The gas enters by the passage *s* and the air by the passage *t*. The controlling valve *k* operated by the track rod *m* moved by the governor, controls the admission and regulation of air to the hole *l* in the manner previously described. The admission valve *o* is operated in any usual manner, always opening about the commencement of the suction stroke and closing about its termination. The spring *x* in this arrangement corresponds to the spring *c* in the arrangement previously described; and when the valve *o* is closed it does not exert any influence upon the gas valve *r* but the opening movement of the valve *o* brings the nut *z* into contact with the sliding piece *y* which acts as a stop for one end of the spring *x*; the pressure of the other end of the spring will now tend to open the valve *r* and will do so unless restrained by vacuum in the vacuum cylinder, the action being similar to the arrangement previously described. The stronger spring *v* will always close the valve *o* when the gear allows it to close. A small but stiff buffer spring *w* on the upper side of the nut *z* is used for the purpose of insuring the closure of the gas valve *r* and forcing the vacuum piston *u* against the end of its cylinder.

When internal combustion engines have to work on light loads it is not always desirable to reduce the quantity of gas so as to give very small impulses, as such small quantities of gas are not economically burned; it is therefore preferable under most circumstances to cut out some impulses thus driving the engine with moderately weak occasional impulses. We can construct this gear in such a manner that this can readily be done, a suitable arrangement being shown in Fig. 5 Sheet 3, which is a similar view to Fig. 3 but drawn on a larger scale and having a different method of controlling the admission of air to the vacuum cylinder. In this arrangement a small valve 1 is connected by a track rod 2 to the governor, the light spring 5 tending to keep this small valve 1 open. As the speed of the engine rises the governor closes the valve 1 thus restricting the amount of air drawn through the hole 3, which corresponds with the hole 1 leading into the vacuum cylinder 10, see Fig. 1, and thus regulating the opening of the gas valve. When, however, the valve 1 is pressed by the governor so as to be nearly closed, the sudden suction of the vacuum piston causes the valve 1 to close entirely, compressing the spring 5, when this vlave closes no air can obtain access to the vacuum cylinder and the gas valve is prevented from opening so that only air is drawn into the engine cylinder during this suction stroke and no impulse is given to the engine. When the admission valve closes, the vacuum piston shown in the preceding views is forced home and the valve 1 again opens as far as the governor will allow it. The amount of pressure exerted on the valve 1 by the spring 5 can be regulated by the adjusting screw 4 which thus decides when non-impulse strokes are to be given.

Internal combustion engines working on the "Otto" or four stroke cycle require a certain amount of compression pressure before ignition to counteract the inertia of the reciprocating parts and to prevent a reversal of strains which might otherwise cause shock, thus making it desirable to use a means of governing which always provides for a cylinder full of air and gas at the termination of the suction stroke under all circumstances.

We wish it to be understood that a gas valve operated in the manner described may be arranged in various ways and we do not confine ourselves to the special manner described and illustrated so long as the essential part of the invention is retained; that is to say, the gas valve being opened any time during the suction stroke, or not at all, as decided by the governor moving a small valve admitting air to an air cylinder, the gas valve however always closing at about the same time as the admission valve, there being a spring or its equivalent on the gas valve which has no tendency to move the valve so long as the pusher piece $g$ is clear of the die $h$, but when the pusher piece $g$ moves the die $h$ the plunger piece $f$ takes up this movement, and the pressure of the spring $c$ is transferred to the opening mechanism at the one end, while this pressure at the other end tends to open the valve $a$, the degree of the vacuum in the air cylinder deciding if the valve is to be opened or not, and if to be opened then the timing of the opening.

The suction of the piston during the suction stroke or the weight of the gas valve may assist in opening the gas valve as for instance in the arrangement shown in Fig. 4, thus reducing the duty of the spring $x$ which might even not be necessary in some cases, as the valve $r$ would be opened by the suction and its weight and would be closed by the nut $z$ and buffer spring $w$.

What we claim and desire to secure by Letters Patent of the United States is:—

1. In an internal combustion engine, the combination with the gas valve, a vacuum cylinder, a piston therein and connected with the gas valve, means for controlling the air supply to the vacuum cylinder from the governor and springs operating on the valve piston, arrange to vary the time of opening of the gas valve which closes with the admission valve.

2. In combination, the gas valve, springs operating thereon, the admission valve, springs operating thereon, an air cylinder, a piston therein and connected with the gas valve, a valve controlling the admission of air to the cylinder and means for actuating the valve from the governor.

In testimony whereof we have signed our names to this specification in the presence of two subscribing witnesses.

WILLIAM JOHN CROSSLEY.
JAMES ATKINSON.

Witnesses:
JOHN MATHIESON,
THOMAS DORRINGTON.